(12) United States Patent
Watanabe et al.

(10) Patent No.: US 7,921,951 B2
(45) Date of Patent: Apr. 12, 2011

(54) MOUNTING STRUCTURE FOR STORAGE BATTERY DEVICE

(75) Inventors: Ko Watanabe, Nishikamo-gun (JP); Syuji Nagase, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/712,942

(22) Filed: Feb. 25, 2010

(65) Prior Publication Data

US 2010/0170736 A1 Jul. 8, 2010

Related U.S. Application Data

(62) Division of application No. 10/591,459, filed as application No. PCT/IB2005/000470 on Feb. 24, 2005, now Pat. No. 7,717,207.

(30) Foreign Application Priority Data

Mar. 2, 2004 (JP) ................................. 2004-057931

(51) Int. Cl.
*B60R 16/04* (2006.01)
(52) U.S. Cl. ........................ 180/68.5; 280/274
(58) Field of Classification Search .................. 180/274, 180/68.5; 296/187.03, 187.05, 187.08, 187.11
See application file for complete search history.

(56) References Cited

U.S. PATENT DOCUMENTS

| 1,911,401 | A | | 5/1933 | Scott |
| 4,327,809 | A | | 5/1982 | Fenstermaker |
| 4,621,822 | A | | 11/1986 | Knoechelmann et al. |
| 5,476,151 | A | * | 12/1995 | Tsuchida et al. ............... 180/274 |
| 5,555,950 | A | | 9/1996 | Harada et al. |
| 5,681,057 | A | | 10/1997 | Whireley et al. |
| 5,947,223 | A | | 9/1999 | Rebmann |
| 6,386,611 | B1 | | 5/2002 | Buchfink et al. |
| 6,431,300 | B1 | | 8/2002 | Iwase |
| 6,478,106 | B2 | | 11/2002 | Hawener et al. |
| 6,598,691 | B2 | | 7/2003 | Mita et al. |
| 6,648,090 | B2 | | 11/2003 | Iwase |
| 6,662,891 | B2 | | 12/2003 | Misu et al. |

(Continued)

FOREIGN PATENT DOCUMENTS

JP 05-305821 A 11/1930

(Continued)

*Primary Examiner* — Jeffrey J Restifo
(74) *Attorney, Agent, or Firm* — Kenyon & Kenyon LLP

(57) ABSTRACT

Two side members are provided so as to be in side portions of a vehicle. Each side member is provided with a kick-up portion curved upward. A cross member is provided so as to interconnect side surfaces of forward portions of the kick-up portions of the two side members. A forward portion of a battery pack is fixed to an upper surface of the cross member via forward brackets welded to the forward portion of the battery pack. A rearward portion of the battery pack is fixed to upper surfaces of rearward portions of the kick-up portions of the two side members via a bridge provided so as to interconnect the two side members.

7 Claims, 6 Drawing Sheets

U.S. PATENT DOCUMENTS

| | | | |
|---|---|---|---|
| 6,827,168 B2 * | 12/2004 | Miyazaki | 180/68.5 |
| 7,066,515 B2 * | 6/2006 | Pierce et al. | 296/21 |
| 7,070,015 B2 * | 7/2006 | Mathews et al. | 180/68.5 |
| 7,144,039 B2 | 12/2006 | Kawasaki et al. | |
| 7,503,585 B2 | 3/2009 | Hashimura et al. | |
| 7,513,329 B2 | 4/2009 | Nakashima et al. | |
| 7,654,351 B2 * | 2/2010 | Koike et al. | 180/68.5 |
| 7,717,207 B2 * | 5/2010 | Watanabe et al. | 180/68.5 |
| 2003/0070858 A1 | 4/2003 | Kondo | |
| 2003/0089540 A1 | 5/2003 | Koike et al. | |
| 2007/0215399 A1 | 9/2007 | Watanabe et al. | |
| 2008/0196957 A1 * | 8/2008 | Koike et al. | 180/68.5 |
| 2009/0026802 A1 | 1/2009 | Imada et al. | |
| 2009/0090575 A1 | 4/2009 | Nagasaka | |
| 2010/0101885 A1 * | 4/2010 | Nozaki et al. | 180/232 |

FOREIGN PATENT DOCUMENTS

| | | |
|---|---|---|
| JP | 02-048248 A | 2/1990 |
| JP | 02-142056 A | 5/1990 |
| JP | 05-201355 A | 8/1993 |
| JP | 05-201356 A | 8/1993 |
| JP | 07-081431 A | 3/1995 |
| JP | 07-117489 A | 5/1995 |
| JP | 08-192639 A | 7/1996 |
| JP | 2001-113959 A | 4/2001 |
| JP | 2003-127907 A | 5/2003 |
| JP | 2005-132348 A | 5/2005 |
| WO | WO 2005/084985 | 9/2005 |

* cited by examiner

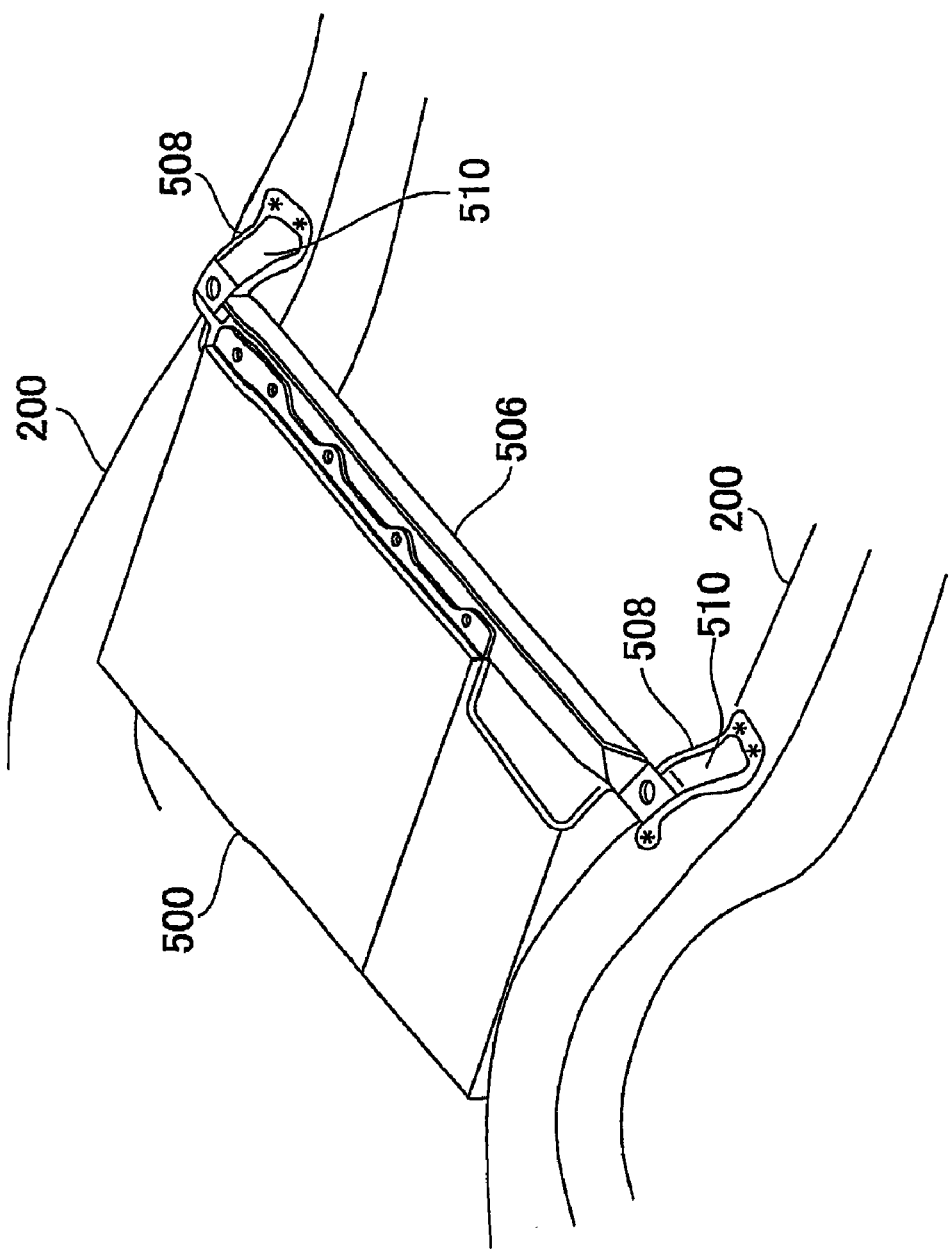

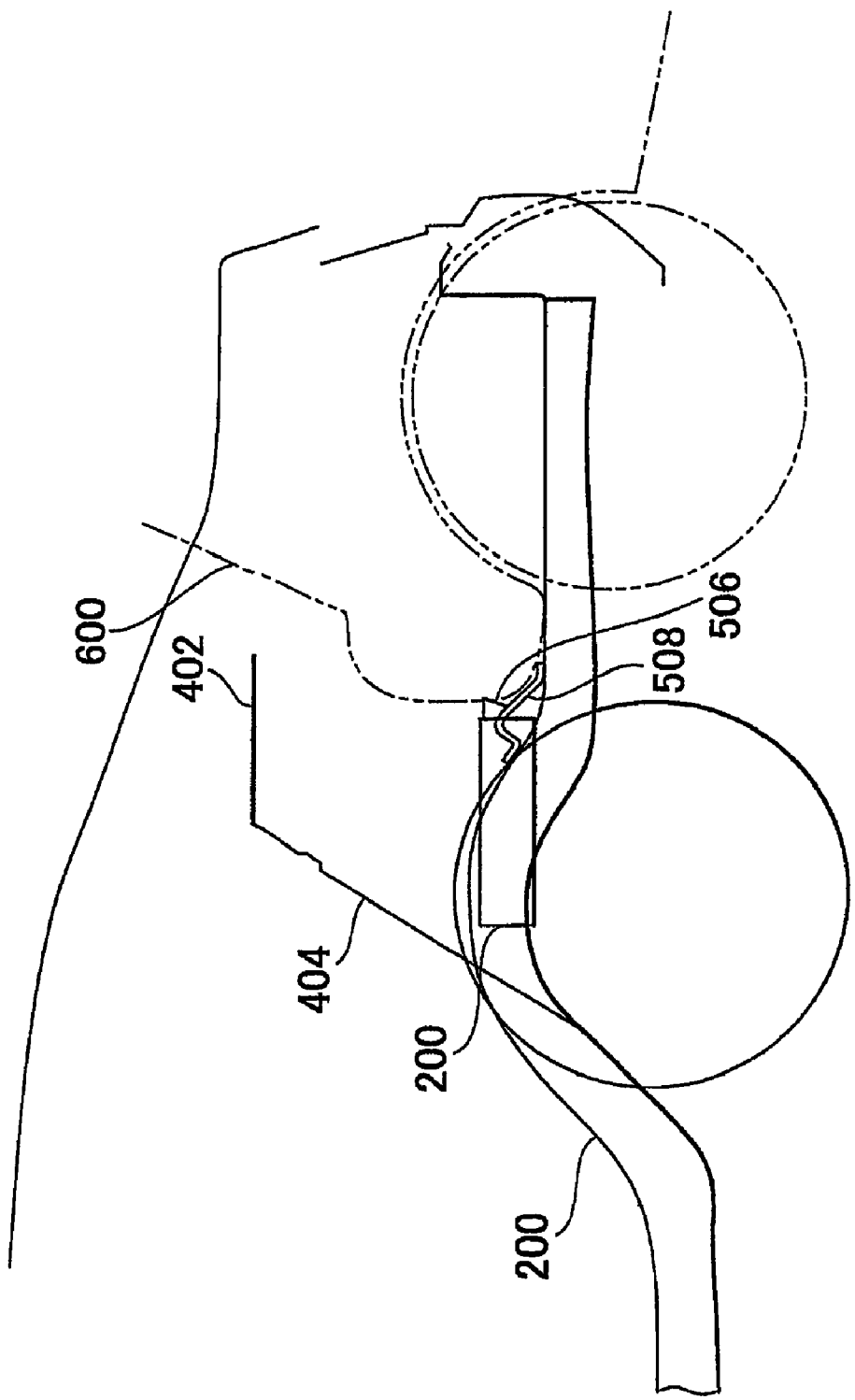

MOUNTING STRUCTURE FOR STORAGE BATTERY DEVICE

INCORPORATION BY REFERENCE

This is a division of application Ser. No. 10/591,459 filed 1 Sep. 2006 now U.S. Pat. No. 7,717,207, which is a 371 national phase application of PCT/IB2005/000470 filed 24 Feb. 2005, claiming priority to Japanese Patent Application No. 2004-057931 filed 2 Mar. 2004, the contents of which are incorporated herein by reference.

FIELD OF THE INVENTION

The invention relates to a mounting structure for a storage battery device and, more particularly, to a mounting structure for a storage battery device installed in a vehicle.

BACKGROUND OF THE INVENTION

Recently, attention has been drawn to vehicles run by drive power from an electric motor, for example, hybrid vehicles, fuel cell vehicles, electric vehicles, etc., as environmental protection measures. Such a vehicle is equipped with a battery, a capacitor, or the like for storing electric power to be supplied to an electric motor.

Japanese Patent Application Publication No. JP-A-7-117489 discloses a battery mounting structure for an electric vehicle which allows a reduction of the space in a cabin which is taken up by the battery. The battery mounting structure for an electric vehicle described in Japanese Patent Application Publication No. JP-A-7-117489 is a structure for mounting a battery in an electric vehicle that has side members (side frames) that extend in the longitudinal direction of the vehicle. In this battery mounting structure, a plurality of vertically stacked batteries are disposed between the wheel-base portions of the side members so that the batteries protrude in the up-down direction with respect to the side members. A battery case that houses the batteries is mounted near kick-up portions of the side members by a vertically arranged pair of mounting members that sandwich the side members.

According to the structure disclosed in this patent application publication, since a plurality of vertically stacked batteries are disposed so as to protrude in the up-down directions from the side members, it is possible to reduce the space taken up by the battery in the cabin. Furthermore, since batteries, which are heavy in weight, are disposed between the wheel-base portions of the side members extending in the longitudinal direction of the vehicle, the center of gravity of the electric vehicle does not become one-sided toward the front or rear of the vehicle body. This allows securement of a large cabin space and utilization of an ample space, and makes it possible to improve the steerability. Furthermore, the battery case is mounted on the side members by a vertical pair of mounting members that are provided so as to sandwich the side members. By mounting the battery case in this manner, the side members are reinforced.

However, since the battery case is thinly mounted on the side members in the structure described in the aforementioned publication, the structure has the following problems. If a side member is squeezed and deformed, for example, in the case where the vehicle is rear-ended by another vehicle, the battery case will likely be deformed together with the side members, and the battery case and the batteries therein may possibly break.

DISCLOSURE OF THE INVENTION

It is an object of the invention to provide a mounting structure for a storage battery device which will prevent or reduce the damage to the storage battery device.

A first aspect of the invention relates to a structure for mounting a storage battery device installed in a vehicle. The vehicle has a frame that extends in a longitudinal direction of the vehicle. The frame has a deformable portion that deforms in an up-down direction by a load in the longitudinal direction of the vehicle. The mounting structure comprises a fixing member that fixes the storage battery device to the frame so that the storage battery device moves relatively to the deformable portion when the deformable portion deforms.

According to the first aspect, the fixing member fixes the storage battery device to the frame so that the storage battery device moves relatively to the deformable portion when the deformable portion deforms. Therefore, when the deformable portion is deformed by a load in the longitudinal direction, the shape of the storage battery device is maintained and only the deformable portion undergoes deformation. Therefore, the transfer of load to the storage battery device can be prevented or reduced. Hence, it becomes possible to provide a mounting structure for a storage battery device which is capable of preventing or reducing the damage to the storage battery device.

The deformable portion may be a kick-up portion formed by bending the frame upward, and the fixing member may be a member that fixes the storage battery device to an upper surface of the kick-up portion of the frame.

In this structure, the storage battery device is fixed to the upper surface of the kick-up portion of the frame. Since the kick-up portion is formed by bending or curving the frame upward, the kick-up portion of the frame further bends in up-down directions, for example, in the case where the vehicle is rear-ended and the frame receives load in the longitudinal direction of the vehicle. Since the storage battery device is fixed, via the fixing member, to the upper surface of the kick-up portion of the frame, the storage battery device moves relatively to the kick-up portion when the kick-up portion further bends. That is, the shape of the storage battery device is maintained, and only the kick-up portion bends. Therefore, the load input to the frame is restrained from transferring to the storage battery device. Hence, the damage to the storage battery device can be prevented or reduced.

The mounting structure may further comprise means for fixing a forward portion of the storage battery device to a forward portion of the kick-up portion. The fixing member may be a member that fixes a rearward portion of the storage battery device to a rearward portion of the kick-up portion.

According to this structure, the forward portion of the storage battery device is fixed to the forward portion of the kick-up portion, and the rearward portion of the storage battery device is fixed to the rearward portion of the kick-up portion via the fixing member. Since the kick-up portion is formed by bending or curving the frame upward, the kick-up portion deforms in a predetermined fashion as described below if a load in the longitudinal direction of the vehicle is input to the frame. That is, the kick-up portion is squeezed in the longitudinal direction of the vehicle, protruding upward with a forward portion of the kick-up portion bending upward and a rearward portion of the kick-up portion bending downward. Therefore, since the forward portion of the storage battery device is fixed to the forward portion of the kick-up portion, the storage battery device is turned upward, that is, a rearward portion of the storage battery device is raised upward, as the kick-up portion deforms. At this time, the rearward portion of the kick-up portion deforms so as to become apart from the rearward portion of the storage battery device in the up-down direction since the rearward portion of the storage battery device is fixed to the rearward portion of the kick-up portion by the fixing member as described above. Therefore, the load input to the frame is restrained from transferring to the storage battery device. Furthermore, due to the upward turning of the storage battery device, the storage battery device moves forward with respect to the vehicle. Thus, the storage battery device can be moved apart from the rear-ending vehicle, and the direct input of load to the storage battery device from the vehicle can be prevented or reduced. Hence, the damage to the storage battery device can be prevented or reduced.

Two frames as described above may be provided so as to be in side portions of the vehicle. The fixing member may comprise a bridge portion that connects the two frames in a transverse direction of the vehicle. The storage battery device may be fixed to the frames via the bridge portion.

According to this structure, the two frames are provided so as to be in side portions of the vehicle, and the storage battery device is fixed to the frames via the bridge portion that connects the two frames in a transverse direction of the vehicle. Therefore, when the rearward portion of the storage battery device is raised by deformation of the frames, the load transferred to the storage battery device via the fixing member is dispersed by the bridge portion, so that concentration of stress in the storage battery device is prevented or reduced. Hence, the damage to the storage battery device can be prevented or reduced.

Furthermore, the fixing member may fix the storage battery device to the frames, in a rearward portion of the vehicle. The bridge portion may be provided rearward of the storage battery device.

According to this structure, the storage battery device is fixed to a rearward portion of the vehicle, and the bridge portion is provided rearward of the storage battery device. Therefore, for example, if the vehicle is rear-ended by another vehicle, the bridge portion prevents or reduces the impact of the rear-ending vehicle on the storage battery device. Hence, the damage to the storage battery device can be prevented or reduced.

The meaning of "the storage battery device moves relatively to the deformable portion" may include a meaning of "the storage battery device moves in an up-down direction together with a deformation in a up-down direction of the deformable portion", and "the storage battery device moves with the deformable portion in a direction in which the deformable portion deforms.

A second aspect of the invention relates to a structure for mounting a storage battery device installed in a vehicle. The mounting structure comprises a fixing member that fixes a rearward portion of the storage battery device to the vehicle. The fixing member includes an inclined portion that is inclined forwardly upward.

According to this structure, the fixing member that fixes a rearward portion of the storage battery device is provided with an inclined portion that is inclined forwardly upward. Therefore, for example, if the vehicle is rear-ended and the rear-ending vehicle penetrates to the vicinity of the storage battery device, the bumper of the rear-ending vehicle is caused to ride over or climb the inclined portion. Thus, the input of collision load to the storage battery device from rear can be prevented or reduced. Hence, it is possible to provide a mounting structure for a storage battery device which is capable of preventing or reducing the damage to the storage battery device.

In the second aspect, the vehicle may have two frames that extend in a longitudinal direction of the vehicle and that are provided so as to be in the side portions of the vehicle. The fixing member may fix the storage battery device to a rearward portion of the vehicle. The fixing member may comprise a bridge portion that connects the two frames in a transverse direction of the vehicle. The bridge portion may be provided rearward of the storage battery device.

According to this structure, the storage battery device is fixed to a rearward portion of the vehicle, and the bridge portion is provided rearward of the storage battery device. Therefore, for example, if the vehicle is rear-ended, the bridge portion prevents or reduces the impact of the colliding vehicle on the storage battery device. Hence, the damage to the storage battery device can be prevented or reduced.

The storage battery device of the invention may include a battery, a capacitor (condenser) or the like.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 5 is a perspective view of a rearward bracket in a mounting structure for a storage battery device in accordance with a second embodiment of the invention; and FIG. 6 is a side view diagram illustrating a state in a rear-end collision where a rear-ending vehicle is penetrating into the trunk compartment of a vehicle to which a mounting structure for a storage battery device in accordance with the second embodiment is applied.

DETAILED DESCRIPTION OF PREFERRED EMBODIMENTS

Figure 1:
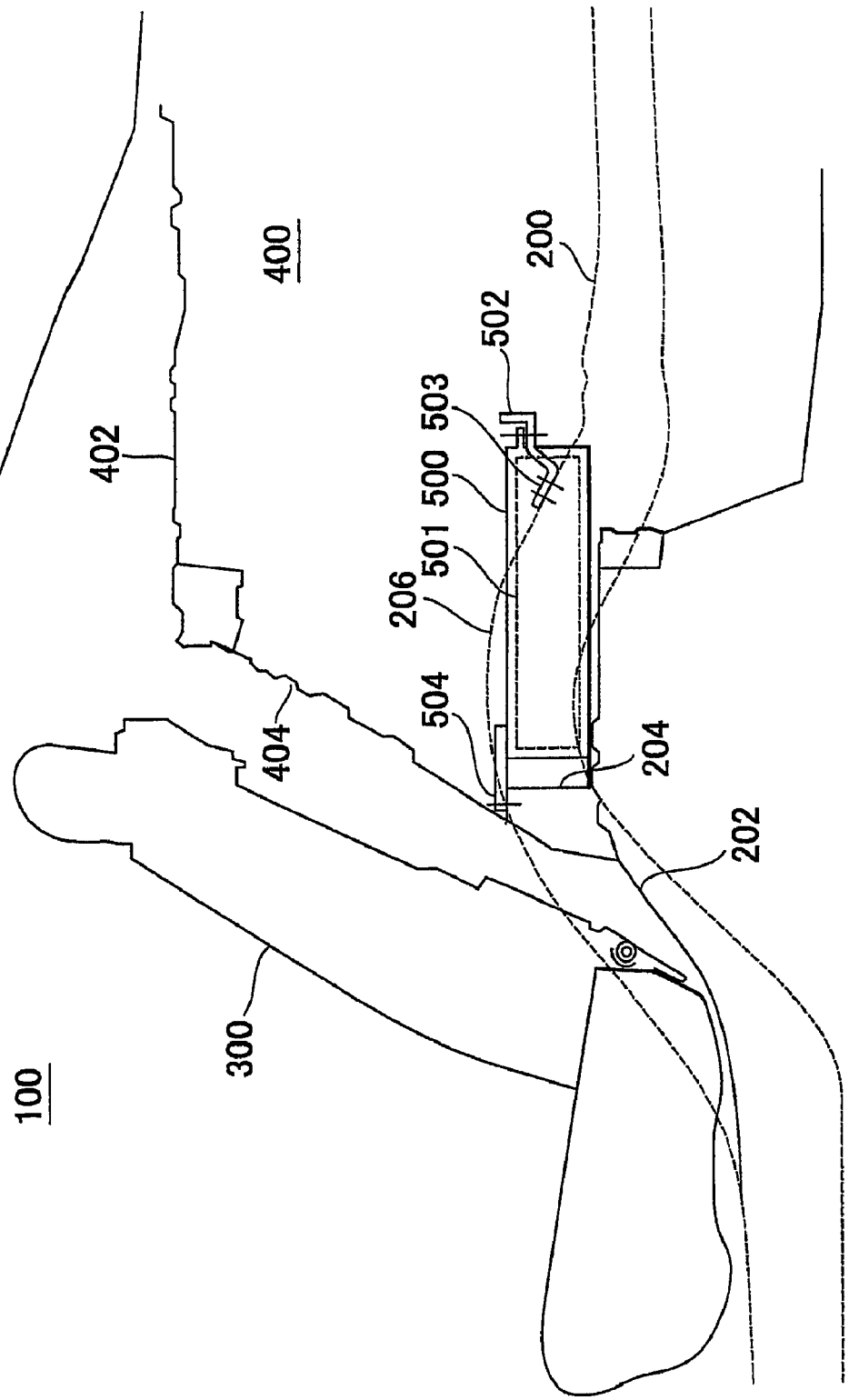
FIG. 1 is a side view of a vehicle to which a mounting structure for a storage battery device in accordance with a first embodiment of the invention is applied.

Preferred embodiments of the invention will be described hereinafter with reference to the accompanying drawings. In the drawings and the following description, identical component parts are indicated by identical reference numerals. The identical component parts have identical names and identical functions. Hence, the identical components will not repeatedly be described.

First Embodiment

With reference to FIG. 1, a vehicle 100 to which a mounting structure for a storage battery device in accordance with a first embodiment of the invention is applied will be described. The vehicle 100 includes side members (side frames) 200, a floor panel 202, a cross member 204, a rear seat 300 provided in a passenger compartment, and a trunk compartment 400 provided rearward of the passenger compartment. The vehicle 100 is a sedan type vehicle in which the passenger compartment and the trunk compartment are partitioned.

Each side member 200 includes an upwardly curved kick-up portion 206 at a location corresponding to a rear wheel (not shown). Two side members 200 are provided so that each side member 200 is positioned in a corresponding side portion of the vehicle 100. The floor panel 202 is provided between the two side members 200, and forms a floor surface of the vehicle 100. The cross member 204 is disposed at a location corresponding to forward portions of the kick-up portions 206 of the side members 200 so as to interconnect side surfaces of the two side members 200.

The trunk compartment 400 is partitioned from the passenger compartment by a rear package tray 402 provided in a horizontal direction in a rearward portion of the vehicle 100, and a partition panel 404 provided rearward of the rear seat 300.

A battery pack 500 is disposed within the trunk compartment 400. The battery pack 500 contains a battery 501. The battery 501 is formed by a series connection of a plurality of battery modules each formed by connecting a plurality of cells in series. Incidentally, the battery 501 may be replaced by a capacitor (condenser) or the like.

A rearward portion of the battery pack 500 is fixed to upper surfaces of the kick-up portions 206 of the two side members 200, via a bridge 502 that is provided so as to interconnect the side members 200. The rearward portion of the battery pack 500 is fixed (bolted up) to the bridge 502, at a plurality of locations in a flange portion of the battery pack 500.

A forward end of the bridge 502 is positioned forward of a rearward end of the battery pack 500, and includes fixing portions 503 that are provided integrally with two opposite ends of the bridge 502. The bridge 502 is fixed (bolted up), at the fixing portions 503, to the upper surfaces of the side members 200. The bridge 502 is disposed at a position that is rearward of the battery pack 500 and that is above the vertical position of a bottom surface of the battery pack 500 and is below the vertical position of an upper surface of the battery pack 500.

Figure 2:
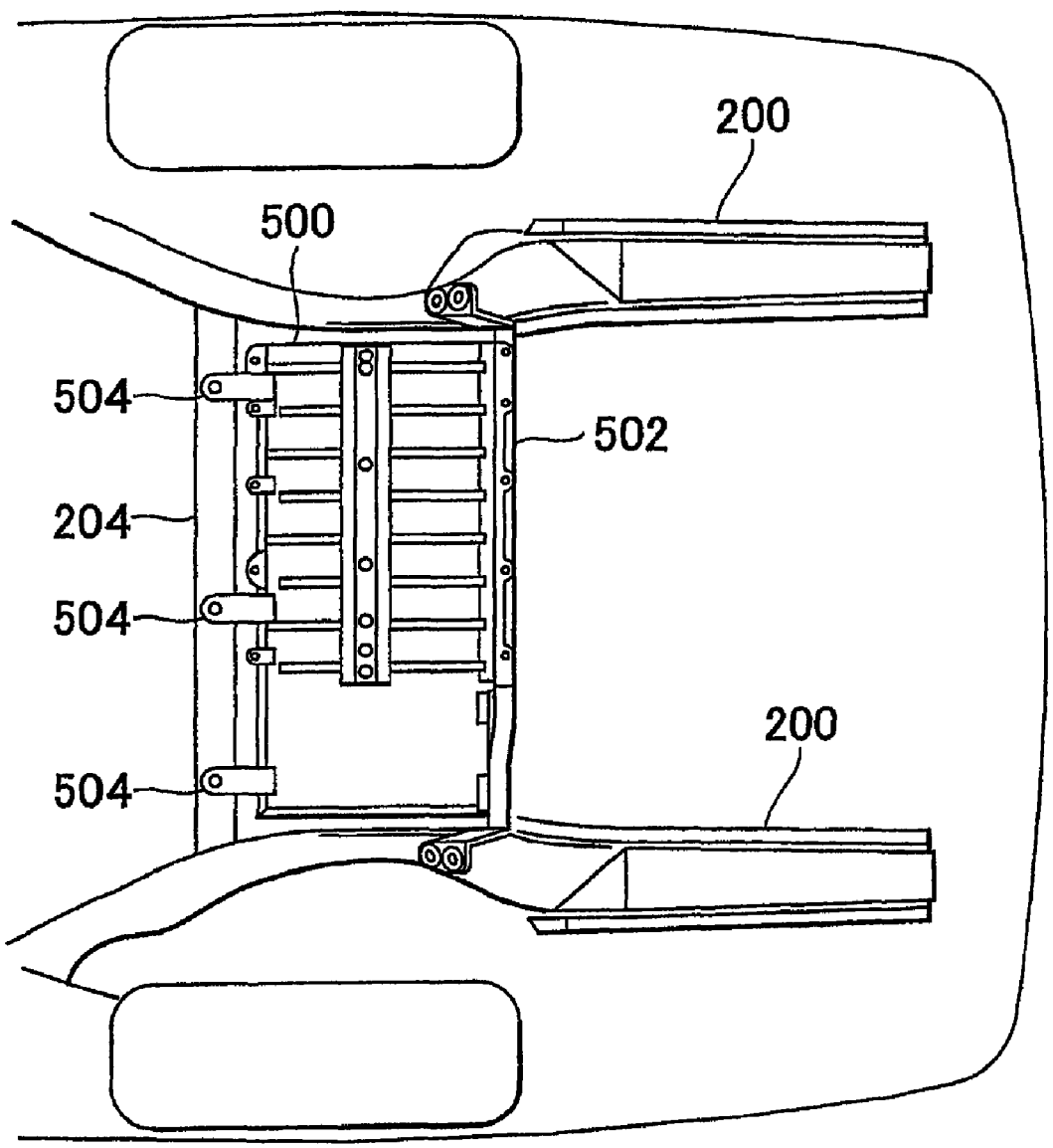
FIG. 2 is a plan view of a vehicle to which a mounting structure for a storage battery device in accordance with the first embodiment is applied.
Figure 3:
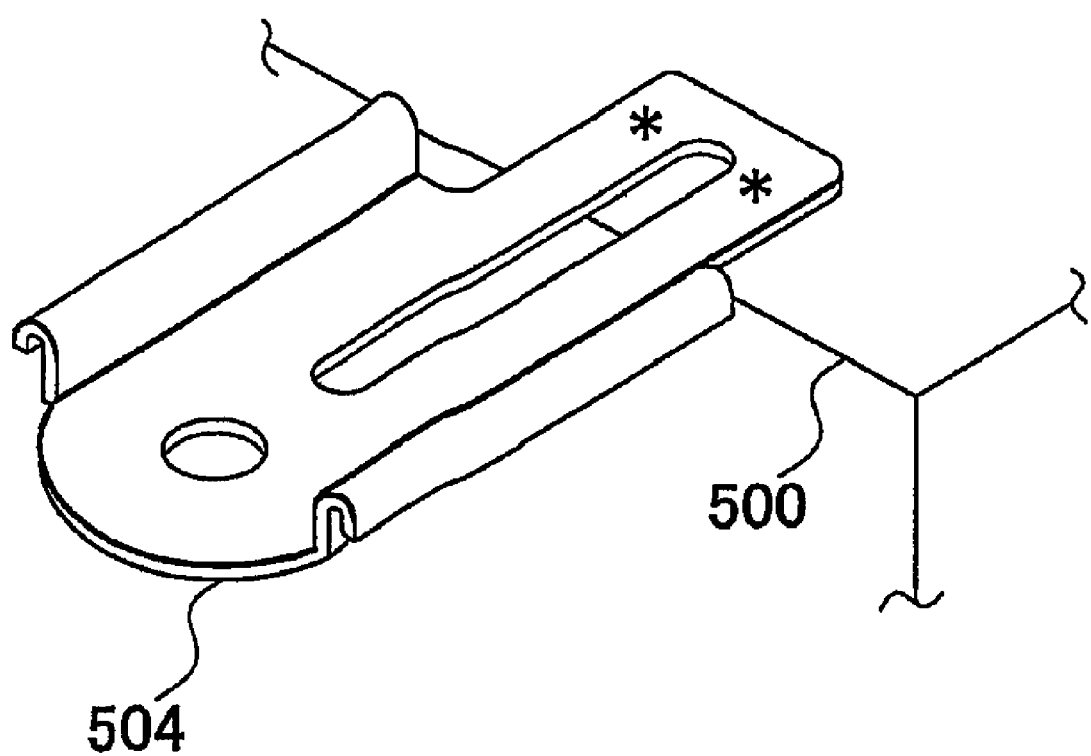
FIG. 3 is a perspective view of a forward bracket.

A forward portion of the battery pack 500 is fixed to an upper surface of the cross member 204, via forward brackets 504 welded to the forward portion of the battery pack 500. The forward portion of the battery pack 500 is fixed to the side members 200 via the cross member 204. As shown in FIG. 2, three forward brackets 504 are welded to the forward portion of the battery pack 500. With the forward brackets 504, the battery pack 500 is fixed (bolted up) at three locations to the upper surface of the cross member 204. As shown in FIG. 3, a rearward portion of each forward bracket 504 is welded to the forward portion of the battery pack 500. A forward portion of each forward bracket 504 has a bolt insert hole.

Operations of the mounting structure for a storage battery device in accordance with this embodiment which are realized on the basis of the above-described structure will be described.

Figure 4A:
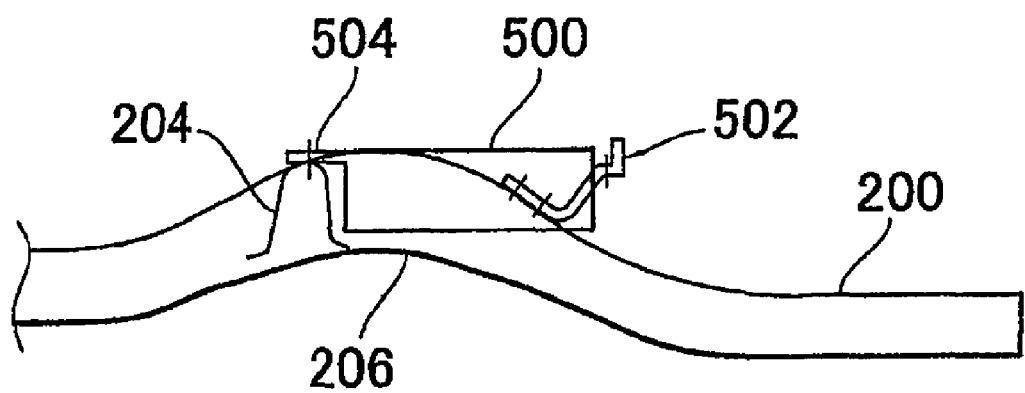
FIGS. 4A and 4B are side view diagrams illustrating states before and after occurrence of a rear-end collision of a vehicle to which a mounting structure for a storage battery device in accordance with the first embodiment is applied.
Figure 4B:
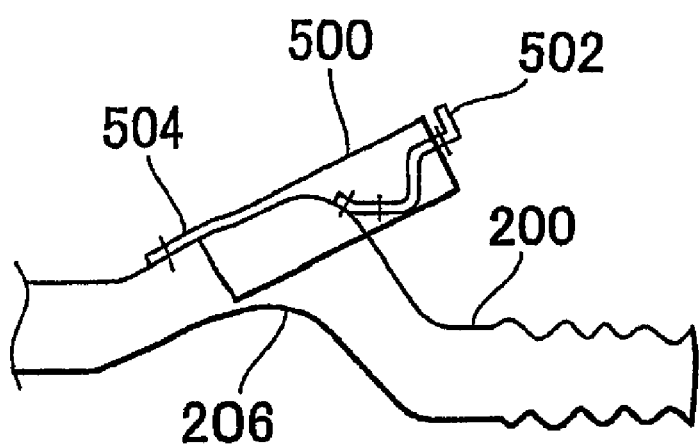

As shown in FIG. 4A, each side member 200 is curved upward at the kick-up portion 206. If the vehicle 100 is rear-ended so that the side members 200 receive a load in the longitudinal direction of the vehicle, each kick-up portion 206 is squeezed in the longitudinal direction of the vehicle, protruding upward with a forward portion of the kick-up portion 206 bending upward and a rearward portion of the kick-up portion 206 bending downward, as shown in FIG. 4B.

Since the forward portion of the battery pack 500 is fixed to the cross member 204, the battery pack 500 receives a force that turns the battery pack 500 upward as the forward portion of the kick-up portion 206 deforms. Furthermore, since a rearward portion of the kick-up portion 206 protrudes upward while squeezing, the fixing portion 503 of the bridge 502 is pushed upward. Therefore, the rearward portion of the battery pack 500 is also pushed upward. At this time, the force that pushes the battery pack 500 upward is transferred to the battery pack 500 in a dispersed fashion by the bridge 502. Therefore, stress concentration does not occur in the battery pack 500.

In contrast, the rearward portion of the kick-up portion 206 of each side member 200 bends downward. Since the fixing portions 503 of the bridge 502 are fixed to the upper surfaces of the rearward portions of the kick-up portions 206 of the side members 200, the fixing portions 503 deform, so that the rearward portion of each kick-up portion 206 and the rearward portion of the battery pack 500 become apart from each other in up-down directions.

Hence, the shape of the battery pack 500 is maintained, and only the side members 200 deform. Thus, load energy input to the side members 200 is consumed for the squeeze of the side members 200 in the longitudinal direction of the vehicle and the deformation of the kick-up portions 206. Hence, the load transferred to the battery pack 500 is prevented or reduced.

Due to the aforementioned upward turning of the battery pack 500, the rearward portion of the battery pack 500 moves forward with respect to the vehicle. Thus, the distance of the battery pack 500 from the rear-ending vehicle increases, so that the load input to the battery pack 500 directly from the rear-ending vehicle can be prevented or reduced. Incidentally, it is also possible to adopt a construction that causes the battery pack 500 to turn downward.

In the mounting structure for a storage battery device in accordance with this embodiment, a forward portion of the battery pack is fixed to forward portions of the kick-up portions via the cross member. A rearward portion of the battery pack is fixed to the upper surfaces of rearward portions of the kick-up portions of the side members. If the kick-up portions deform, the bridge deforms so as to allow the rearward portion of the battery pack and the rearward portion of each kick-up portion to move apart from each other in up-down directions. Therefore, the shape of the battery pack is maintained, and only the side members deform. Thus, load input to the side members is consumed for the squeeze of the side members in the longitudinal direction of the vehicle and the deformation of the kick-up portions. Hence, the load transferred to the battery pack is prevented or reduced. Consequently, the damage to the battery pack at the time of a rear-end collision can be prevented or reduced.

Second Embodiment

A vehicle to which a mounting structure for a storage battery device in accordance with a second embodiment of the invention is applied will be described with reference to FIGS. 5 and 6. Although in the first embodiment, the bridge is fixed to the side members via the fixing portions positioned forward of the rearward end of the battery pack, a bridge in the second embodiment is fixed to the side members via rearward brackets that are positioned rearward of the rearward end of the battery pack. Other constructions of the second embodiment are the same as those of the first embodiment. The functions of those constructions are also the same as in the first embodiment. Therefore, detailed descriptions thereof will not be repeated.

As shown in FIG. 5, a bridge 506 is fixed to upper surfaces of the side members 200, via rearward brackets 508. The bridge 506 is disposed at a position that is rearward of the battery pack 500 and that is above the vertical position of a bottom surface of the battery pack 500 and is below the vertical position of an upper surface of the battery pack 500.

Each rearward bracket 508 includes an inclined portion 510 that is inclined forwardly upward. The inclined portion 510 of each rearward bracket 508 is positioned rearward of the rearward end of the battery pack 500.

Operations of the mounting structure for a storage battery device in accordance with this embodiment which are realized on the basis of the above-described structure will be described.

Assumed herein is a case as indicated in FIG. 6 where the vehicle 100 is rear-ended by a large-size vehicle, for example, an SUV (sport utility vehicle). Since the rear-ending vehicle 600 indicated by two-dot chain lines has an increased minimum ground clearance, a bumper of the rear-ending vehicle 600 moves in over or on top of the side member 200. In this case, the rear-ending vehicle 600 penetrates into the trunk compartment 400.

When the bumper of the rear-ending vehicle 600 penetrates to the position of the battery pack 500, the bumper of the rear-ending vehicle 600 contacts the inclined portion 510 of a rearward bracket 508. Since the inclined portion 510 of each rearward bracket 508 is inclined forwardly upward, the bumper of the rear-ending vehicle 600 rides over or climbs the inclined portion 510, so that the rear-ending vehicle 600 is restrained from contacting the rearward portion of the battery pack 500.

The bridge 506 is provided rearward of the battery pack 500. Since the bridge 506 is provided at a position that is above the vertical position of a bottom surface of the battery pack 500 and is below the vertical position of an upper surface of the battery pack 500, the rearward portion of the battery pack 500 is protected by the bridge 506, so that direct input of load to the battery pack 500 is prevented or reduced.

In the mounting structure for a storage battery device in accordance with this embodiment, the rearward portion of the battery pack is connected to the bridge. The bridge is fixed to the upper surfaces of the side members via the rearward brackets. Each rearward bracket includes the inclined portion that is provided rearward of the battery pack and that is inclined forwardly upward. Therefore, if a rear-ending vehicle penetrates to the position of the battery pack, the bumper of the rear-ending vehicle is caused to ride over or climb the inclined portions, and is thereby restrained from contacting the battery pack. Hence, it becomes possible to prevent or reduce the load input to the battery pack from a rear-ending vehicle and therefore prevent or reduce the damage to the battery pack.

It is to be understood that "a longitudinal direction of a vehicle" used herein means at least one of a fore-to-aft direction of a vehicle, and a traveling direction of a vehicle.

It is to be understood that the embodiments disclosed herein are illustrative in all respects, and are not restrictive at all.

The invention claimed is:

1. A mounting structure for a storage battery device installed in a vehicle, comprising: a frame that extends in a longitudinal direction of the vehicle, wherein the frame has a deformable portion that deforms in an up-down direction by a load in the longitudinal direction of the vehicle; and a fixing member that fixes the storage battery device to the frame so that the storage battery device moves relatively to the deformable portion when the deformable portion deforms, wherein the deformable portion is a kick-up portion formed by bending the frame upward, wherein the fixing member is a member that fixes the storage battery device to an upper surface of the kick-up portion of the frame, and wherein the fixing member is adapted to deform to increase a space in an up-down direction between a rearward portion of the storage battery device and a rearward portion of the kick-up portion.

2. The mounting structure according to claim 1, wherein the fixing member fixes the storage battery device to the upper surface of the kick-up portion of the frame at a portion forward of a rearward end of the storage battery device.

3. The mounting structure according to claim 1, wherein the mounting structure further comprises means for fixing a forward portion of the storage battery device to a forward portion of the kick-up portion, and wherein the fixing member is a member that fixes a rearward portion of the storage battery device to a rearward portion of the kick-up portion.

4. The mounting structure according to claim 1, wherein two of said frame are provided so as to be in side portions of the vehicle, wherein the fixing member comprises a bridge portion that connects the two frames in a transverse direction of the vehicle, and wherein the storage battery device is fixed to the frames via the bridge portion.

5. The mounting structure according to claim 4, wherein the fixing member fixes the storage battery device to the frames, in a rearward portion of the vehicle, and wherein the bridge portion is provided rearward of the storage battery device.

6. The mounting structure according to claim 5, wherein the bridge portion is disposed at a position that is above a vertical position of a bottom surface of the storage battery device and is below a vertical position of an upper surface of the storage battery device.

7. The mounting structure according to claim 1, wherein the storage battery device is disposed within a trunk compartment of the vehicle.

* * * * *

UNITED STATES PATENT AND TRADEMARK OFFICE
CERTIFICATE OF CORRECTION

| | | |
|---|---|---|
| PATENT NO. | : 7,921,951 B2 | |
| APPLICATION NO. | : 12/712942 | |
| DATED | : April 12, 2011 | |
| INVENTOR(S) | : Ko Watanabe et al. | |

It is certified that error appears in the above-identified patent and that said Letters Patent is hereby corrected as shown below:

| Column | Line | |
|---|---|---|
| 1 | 60 | Change "thinly" to --firmly--. |

Signed and Sealed this
Twentieth Day of September, 2011

David J. Kappos
*Director of the United States Patent and Trademark Office*